(12) United States Patent
Patel et al.

(10) Patent No.: US 11,497,340 B2
(45) Date of Patent: Nov. 15, 2022

(54) FOOD COOKING APPLIANCE UTILIZING BOTH STEAM AND HEAT FOR RAPIDLY COOKING FOOD PRODUCTS

(71) Applicant: A. J. ANTUNES & CO., Carol Stream, IL (US)

(72) Inventors: Bhupendra R. Patel, Carol Stream, IL (US); Dipan Patel, Hoffman Estates, IL (US); Jignesh Patel, Bartlett, IL (US); Francisco Vega, Chicago, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 369 days.

(21) Appl. No.: 16/729,338

(22) Filed: Dec. 28, 2019

(65) Prior Publication Data

US 2020/0128995 A1 Apr. 30, 2020

Related U.S. Application Data

(63) Continuation-in-part of application No. 15/393,839, filed on Dec. 29, 2016, now Pat. No. 10,561,273.

(51) Int. Cl.
*A47J 27/04* (2006.01)
*A47J 36/32* (2006.01)
(Continued)

(52) U.S. Cl.
CPC .............. *A47J 27/04* (2013.01); *A47J 27/12* (2013.01); *A47J 36/32* (2013.01); *A47J 37/067* (2013.01); *A47J 2027/043* (2013.01)

(58) Field of Classification Search
CPC .......... A47J 36/06; A47J 27/004; A47J 36/04; A47J 37/06; A47J 37/07; A47J 2027/043
(Continued)

(56) References Cited

U.S. PATENT DOCUMENTS 5,526,734 A 6/1996 Harrison
6,040,564 A 3/2000 Ueda et al.
(Continued)

*Primary Examiner* — Phuong T Nguyen
(74) *Attorney, Agent, or Firm* — Law Offices Of Steven W. Weinrieb

(57) ABSTRACT

A food cooking appliance which utilizes both steam and heat for rapidly cooking food products is disclosed. The food products are disposed within a food cooking housing and a steam generator is provided within a steam generator housing so as to generate steam which is fluidically conducted into the food cooking housing. In this manner, the food products are cooked as a result of the steam being conducted into upper regions of cooking chambers defined within the food cooking housing while the heat generated from the heated grills or platens impart heat to the lower regions of the cooking chambers thereby cooking the food in an accelerated manner which is extremely desirable by commercial fast-food establishments. The steam generator housing is wholly separate and apart from the food cooking housing but fluidically connected to the food cooking housing by a fluid conduit which may rigid or flexible. In this manner, the food cooking housing and the steam generator housing may be located at different locations within a kitchen facility in order that the kitchen facility be capable of accommodating both the food cooking housing and the steam generator housing. The steam generator housing may also be provided with multiple fluid conduits such that a single steam generator can supply steam to a plurality of different appliances.

17 Claims, 3 Drawing Sheets

(51) Int. Cl.
*A47J 27/12* (2006.01)
*A47J 37/06* (2006.01)

(58) Field of Classification Search
USPC ......... 99/303, 330, 355, 339, 340, 401, 419,
99/422, 441, 447, 448, 325; 426/505,
426/510, 511, 523, 614
See application file for complete search history.

(56) References Cited

U.S. PATENT DOCUMENTS

| | | | |
|---|---|---|---|
| 191,915 | A1 | 8/2006 | Kanzaki et al. |
| 98,825 | A1 | 4/2010 | Veltrop et al. |
| 367,062 | A1 | 12/2016 | Kataoka et al. |
| 53,521 | A1 | 2/2019 | Tian et al. |

FOOD COOKING APPLIANCE UTILIZING BOTH STEAM AND HEAT FOR RAPIDLY COOKING FOOD PRODUCTS

CROSS-REFERENCE TO RELATED PATENT APPLICATIONS

This patent application is a Continuation-in-Part (CIP) of United States Patent Application, application Ser. No. 15/393,839 which was filed on Dec. 29, 2016, the priority benefits of which are hereby claimed.

FIELD OF THE INVENTION

The present invention relates generally to food preparation apparatus, equipment, or appliances, and more particularly to a food cooking appliance or apparatus which utilizes both steam and heat for rapidly cooking food products. The food products are disposed within food containers which are effectively formed as openings within one or more plates or templates, wherein the openings may have different geometrical configurations and size dimensions, and the one or more plates or templates are pivotally movable between upper or raised non-cooking positions and lower cooking positions at which the food products, disposed within the openings, are disposed atop one or more heated grills or platens. One or more covers are also utilized to cover the plates or templates such that the food products are cooked within covered environments or cooking chambers. A steam generator is also provided so as to generate steam which is fluidically conducted into the covered food product environments or cooking chambers. In this manner, the food products are cooked as a result of the steam being conducted into the upper regions of the covered environments or cooking chambers while the heat generated from the heated grills, griddles, or platens impart heat to the lower regions of the covered environments or cooking chambers thereby cooking the food in an accelerated manner which is extremely desirable by commercial fast-food establishments. Furthermore, the steam provided for the cooking procedure may be generated by means of a steam generator which is formed as an integral part of the overall cooking apparatus, or, alternatively may comprise a separate steam generator which may be readily connected to, or disconnected from, the food cooking environments or food cooking chambers. In this manner, this type of steam generator may be utilized in connection with other, various different types of food cooking appliances which require the generation and use of steam for their cooking operations, or the steam generator and cooking appliance can satisfy unique spatial or configuration requirements, or a single steam generator can be utilized to provide steam to multiple steam cooking appliances.

BACKGROUND OF THE INVENTION

Commercial fast-food establishments, comprising the burgeoning fast-food industry, obviously require food to be cooked in a relatively short period of time so as to rapidly serve their customers in accordance with what is probably the number one reason consumers patronize fast-food establishments, namely, that the consumers know that they can receive their ordered food in a relatively quick manner or short period of time. Some fast-food cooking appliances or apparatus have in fact employed steam in some capacity as a method of cooking their food products, that is, the appliances, equipment, or apparatus used steam in conjunction with heating apparatus, however, when cooking each new batch of fast-food products, water would have to effectively be poured onto the grilling surface in order to generate the desired steam. Not only did this cooking process effectively slow down the overall cooking time per batch of fresh food being prepared, but the food products were not effectively cooked in an even or balanced manner throughout the food product, that is, from top to bottom, because substantially all of the cooking heat was being generated from the underside portion of the food product. In addition, spatial considerations within a particular fast-food establishment usually mandate limited kitchen facility areas which, in turn, usually mandate the use of relatively small or compact food cooking appliances such as, for example, those that can be placed or installed upon tabletops or countertops, or alternatively, cooking appliances that can nevertheless be accommodated through means of unconventional configurations or arrangements. Alternatively, such spatial considerations may not in fact be sufficient to accommodate a single food cooking appliance which comprises apparatus for both cooking the food and supplying the steam required for the steaming process of the food cooking appliance. Still further, it is also desirable within such food establishments to be able to accommodate a large number of food preparation orders in a relatively small period of time.

A need therefore exists in the art for a new and improved food cooking appliance or apparatus wherein the aforenoted disadvantages or operational drawbacks characteristic of conventional food cooking apparatus, equipment, or appliances are effectively overcome or eliminated. More particularly, a need exists in the art for a new and improved food cooking appliance or apparatus wherein the appliance or apparatus is relatively small in size. Still more particularly, a need exists in the art for a new and improved food cooking appliance or apparatus wherein a steam generator can effectively be fluidically connected with one or more food cooking chambers so as to supply steam into the food cooking chambers. Still yet further, a need exists in the art for a new and improved food cooking appliance or apparatus wherein steam, generated from a steam generator, can be utilized in conjunction with a heated platen or grill whereby both sources of heat can effectively be utilized to cook food products. Yet further, a need exists in the art for a new and improved food cooking appliance or apparatus wherein steam, generated from a steam generator, can be utilized in conjunction with a heated platen or grill such that both sources of heat can be effectively utilized to cook food products in a relatively quick manner and a relatively shortened period of time. Yet still further, a need exists in the art for a new and improved food cooking appliance or apparatus wherein steam, generated from a steam generator, can be utilized in conjunction with a heated platen or grill such that both sources of heat can be effectively utilized to cook food products such that the cooked food products are thoroughly cooked as a result of the steam being conducted into the upper regions of the food cooking chambers while the heated platen or grill generate heat which is effectively conducted into the lower regions of the food cooking chambers.

An additional need in the art exists for a new and improved food cooking appliance or apparatus which, in view of spatial considerations, comprising, for example, limited kitchen facility areas within particular fast-food establishments, will require the use of relatively small or compact food cooking appliances, or alternatively, will require the separation of the cooking appliance from the steam generator per se, while nevertheless being fluidically connected to the cooking section of the cooking appliance, whereby such individual components can be placed or installed upon tabletops, countertops, separate shelves, or alternatively, can be accommodated within unconventional spaces comprising unconventional configurations or arrangements. A still additional need in the art exists for a new and improved food cooking appliance or apparatus wherein a single steam generator can be utilized in conjunction with a plurality of cooking appliances so as to simultaneously provide steam to the plurality of cooking appliances. A yet additional need in the art exists for a new and improved food cooking appliance or apparatus wherein a single steam generator can be utilized in conjunction with a plurality of different types of cooking appliances so as to provide steam to the plurality of different types of cooking appliances.

OVERALL OBJECTIVES OF THE INVENTION

Therefore, an overall objective of the present invention is to provide a new and improved food cooking appliance or apparatus wherein the aforenoted disadvantages or operational drawbacks characteristic of conventional food cooking apparatus, equipment, or appliances are effectively overcome or eliminated. More particularly, an overall objective of the present invention is to provide a new and improved food cooking appliance or apparatus wherein the appliance or apparatus is relatively small in size. Still more particularly, an overall objective of the present invention is to provide a new and improved food cooking appliance or apparatus wherein a steam generator can effectively be fluidically connected with one or more food cooking chambers so as to supply steam into the food cooking chambers. Still yet further, an overall objective of the present invention is to provide a new and improved food cooking appliance or apparatus wherein steam, generated from a steam generator, can be utilized in conjunction with a heated platen or grill whereby both sources of heat can effectively be utilized to cook food products. Yet further, an overall objective of the present invention is to provide a new and improved food cooking appliance or apparatus wherein steam, generated from a steam generator, can be utilized in conjunction with a heated platen or grill such that both sources of heat can be effectively utilized to cook food products in a relatively quick manner and a relatively shortened period of time.

Yet still further, an overall objective of the present invention is to provide a new and improved food cooking appliance or apparatus wherein steam, generated from a steam generator, can be utilized in conjunction with a heated platen or grill such that both sources of heat can be effectively utilized to cook food products such that the cooked food products are thoroughly cooked as a result of the steam being conducted into the upper regions of the food cooking chambers while the heated platen or grill generate heat which is effectively conducted into the lower regions of the food cooking chambers. An additional overall objective of the present invention is to provide a new and improved food cooking appliance or apparatus which, in view of spatial considerations, comprising, for example, limited kitchen facility areas within particular fast-food establishments, will require the use of relatively small or compact food cooking appliances, or alternatively, will require the separation of the cooking appliance from the steam generator per se, while nevertheless being fluidically connected to the cooking section of the cooking appliance, whereby such individual components can be placed or installed upon tabletops, countertops, separate shelves, or alternatively, can be accommodated within unconventional spaces comprising unconventional configurations or arrangements. A still additional overall objective of the present invention is to provide a new and improved food cooking appliance or apparatus wherein a single steam generator can be utilized in conjunction with a plurality of cooking appliances so as to simultaneously provide steam to the plurality of cooking appliances. A yet additional an overall objective of the present invention is to provide a new and improved food cooking appliance or apparatus wherein a single steam generator can be utilized in conjunction with a plurality of different types of cooking appliances so as to provide steam to the plurality of different types of cooking appliances.

SUMMARY OF THE INVENTION

The foregoing and other objectives are achieved in accordance with the teachings and principles of the present invention through the provision of a new and improved food cooking appliance or apparatus which utilizes both steam and heat for rapidly cooking food products. The food products are disposed within food containers which are effectively formed as openings within one or more plates or templates, wherein the openings may have different geometrical configurations and size dimensions. The one or more plates or templates are pivotally movable between first upper or raised non-cooking positions, and second lower cooking positions at which the food products, disposed within the openings, are disposed atop one or more heated grills or platens. One or more covers are also utilized to cover the plates or templates such that the food products are cooked within covered environments or cooking chambers. A steam generator is also provided so as to generate steam which is fluidically conducted into the covered environments or cooking chambers. In this manner, the food products are cooked as a result of the steam being conducted into the upper regions of the covered environments or cooking chambers while the heat generated from the heated grills or platens impart heat to the lower regions of the covered environments or cooking chambers. Furthermore, the food is cooked in an accelerated manner which is extremely desirable by commercial fast-food establishments. In addition, the food is cooked in an even or balanced manner as a result of the steam being disposed within the upper regions of the cooking chambers while heat, generated from the heated grills or platens, impart heat to the lower regions of the cooking chambers.

In accordance with a first embodiment of the present invention, the cooking appliance comprises a housing which has a configuration which is substantially that of a rectangular parallelepiped wherein the steam generator is integrally mounted upon, or incorporated within, a first side wall portion of the housing, a user interface or control panel is integrally formed upon a front side wall portion of the housing, and a food scrap container is removably mounted upon a second side wall portion of the housing whereby food scraps, generated during the various food cooking cycles, may be collected and periodically discarded as a result of the removal of the food scrap container from the housing. The food scrap container may then, of course, be reinstalled upon the housing so as to collect food scraps generated during future food cooking cycles.

In accordance with a second embodiment of the present invention, the steam generator is mounted within a steam generator housing or container which is separate from the food cooking appliance but is fluidically connected to the cooking appliance by means of a suitable fluid conduit which may take the form of a relatively rigid tubular conduit, or a relatively flexible tubular conduit, both of which are fluidically sealed at the opposite ends thereof so as to ensure that steam does not escape from the steam generator while being fludicially conducted into the food cooking appliance. In this manner, the cooking appliance can effectively be located in one area or region of a kitchen facility, while the steam generator housing or container can be located in another area or region of the kitchen facility such that different areas or regions of the kitchen facility, which may not solely be capable of spatially accommodating both the cooking appliance and the steam generator appliance, can nevertheless spatially accommodate the separate cooking and steam generator appliances. In addition, the fluid conduit fluidically connecting the steam generator appliance to the cooking appliance is fitted with a suitable connect/disconnect connector such that the steam generator appliance can be readily fluidically connected or disconnected to or from the cooking appliance as needed for cleaning or maintenance, or alternatively, to permit the fluid conduit to be operatively connected to different types of appliances as needed or desired in order to satisfy cooking requirements of different steam cooking appliances. Lastly, the separate steam generator may also be provided with a plurality of fluid conduits so that the single steam generator can be utilized to simultaneously provide steam to a plurality of cooking appliances.

BRIEF DESCRIPTION OF THE DRAWINGS

Various other features and attendant advantages of the present invention will be more fully appreciated from the following detailed description when considered in connection with the accompanying drawing wherein.

DETAILED DESCRIPTION OF THE ILLUSTRATED EMBODIMENTS

Figure 1:
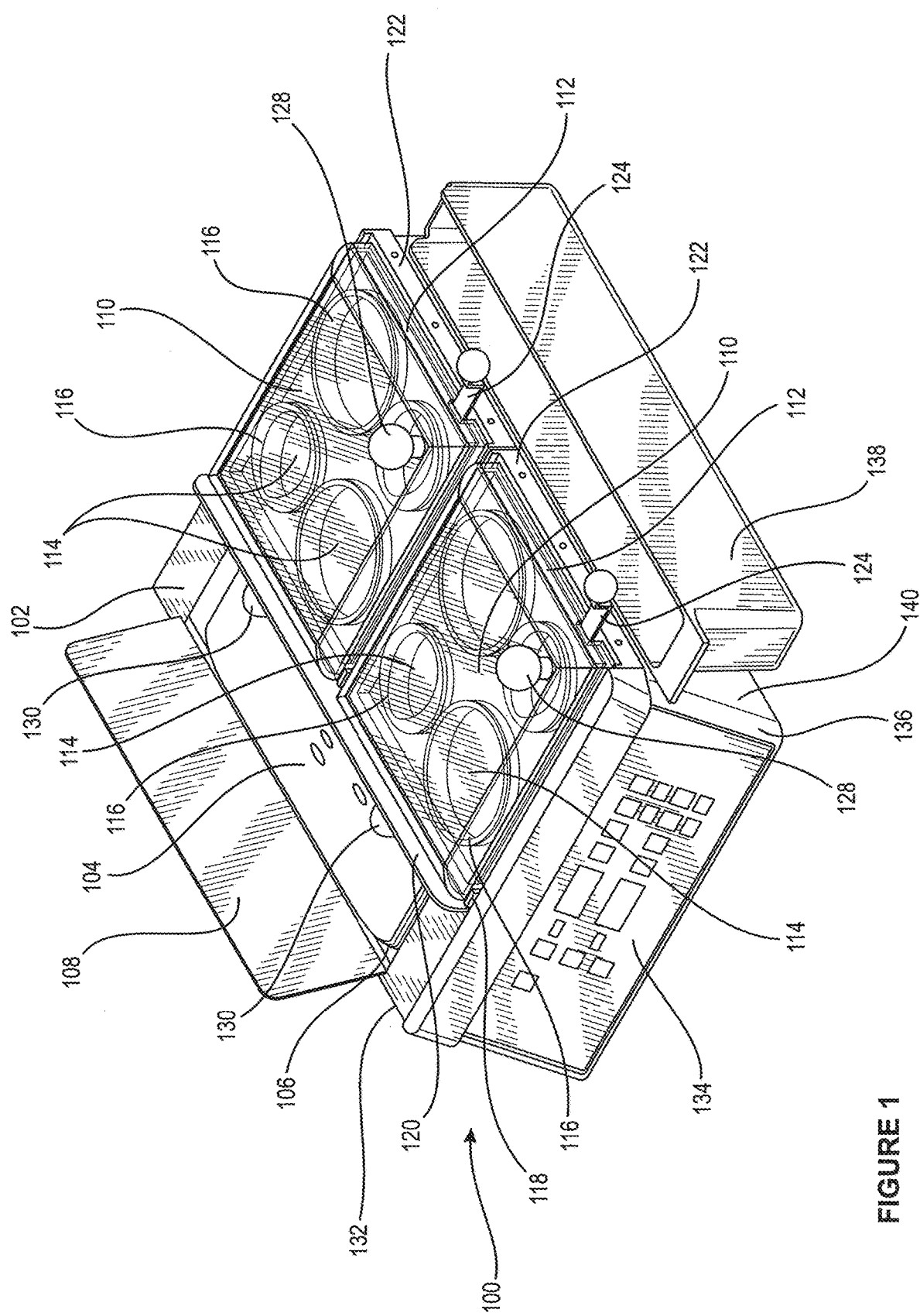
FIG. 1 is a perspective view of a first embodiment of a new and improved food cooking appliance or apparatus, as constructed in accordance with the principles and teachings of the present invention, wherein the steam generator is integrally incorporated within a sidewall region of the cooking appliance housing.

Referring now to the drawings, and more particularly to FIG. 1 thereof, there is disclosed a first embodiment of a new and improved food cooking appliance or apparatus which is constructed in accordance with the principles and teachings of the present invention and which is generally indicated by the reference character 100. More particularly, it is seen that the food cooking appliance or apparatus 100 comprises a housing 102 which has a configuration which is generally that of a rectangular parallelepiped. In accordance with the unique features and structure of the cooking appliance 100, the cooking appliance 100 utilizes both steam and heat for rapidly cooking food products in an accelerated manner. Accordingly, it is seen that a steam generator 104 is disposed within a steam generator housing 106 that is incorporated within a first side wall portion of the housing 102, and the steam generator housing 106 has a cover 108 pivotally mounted upon the outer edge portion of the housing 102 so as to close the steam generator housing 106 when the steam generator 104 is in operation. It is additionally seen that the appliance 100 further comprises a pair of food cooking chambers 110,110, although the appliance is obviously not limited to any specific number of food cooking chambers. Within each one of the food cooking chambers 110,110 there is disposed a plate or template 112 wherein each one of the plates or templates 112,112 is provided with four through-openings 114, although, again, the particular number of openings 114 provided within each plate or template 112 is not limited to four. It is seen that the openings 114 can have different geometrical configurations, and in addition, the openings can have different size dimensions.

Still further, it is seen that each opening 114 is provided with a food containment ring 116 which effectively conforms to the size and configuration of the respective opening 114 within which the food containment ring 116 is disposed. Each one of the plates or templates 112 is pivotally mounted by means of a suitable hinge mechanism 118 which is disposed adjacent to an upstanding partition wall 120 which effectively separates the steam generator housing 106 from the food cooking chambers 110. A pair of heated platens or grills 122,122 are disposed beneath each one of the plates or templates 112 such that when food product, such as, for example, eggs or pancake batter, are poured into the food containment rings 116, the food products will effectively be disposed atop the heated platens or grills 122,122 so as to be heated and cooked by means of the heated platens or grills 122,122. The food containment rings 116 are provided so as to contain the food product therewithin during the food cooking cycle and may accordingly be fabricated from a suitable material, such as, for example, polytetrafluoroethylene or TEFLON® or other thermoplastic material such that upon completion of the food cooking cycle, the plates or templates can be pivotally moved upwardly away from the heated platens or grills 122,122 such that the cooked food products will be readily released from the food containment rings 116, and will be disposed upon the heated platens or grills 122,122 whereby they may be removed therefrom by service personnel using a spatula or similar device. In order to facilitate the pivotal movement of the plates or templates 112,112 between their raised and lowered positions, each one of the plates or templates 112,112 is provided with a handle 124,124.

Continuing further, it is also seen that each one of the food cooking chambers 110,110 is provided with a cover 126 which is adapted to be disposed atop each one of the food cooking chambers 110,110 so as to render the food cooking chambers 110,110 enclosed food cooking environments. A suitable upstanding handle 128 is provided upon each one of the covers 126 so as to readily enable service personnel to remove the covers 126,126 from their positions atop the heated platens or grills 122,122 or to place the covers 126,126 upon the heated platens or grills 122,122. It is noted that when the covers 126,126 are disposed atop the heated platens or grills 122,122, the lower peripheral edge portions of the covers 126,126 are effectively seated upon the peripheral edge portions of the heated platens or grills 122,122 so as to effectively surround the peripheral edge portions of the plates or templates 112,112. The covers may be fabricated from any suitable material, such as, for example, a clear thermoplastic material, stainless steel, or the like. It is to be noted further that in accordance with a unique structural feature of the present invention, the steam generator 104 is fluidically connected to the food cooking chambers 110,110 by means of a pair of steam conduits or feed tubes 130,130 which pass through partition wall 120 and conduct steam, from the steam generator 104, into the upper regions of the enclosed food cooking chambers 110,110. In this manner, the food products, disposed within the food containment rings 116,116, are cooked in an accelerated manner by means of both the steam conducted into the upper regions of the enclosed food cooking chambers 110, 110, as well as by the heat generated by means of the heated platens or grills 122,122. In addition, it is also to be noted that the food is cooked in an even or balanced manner as a result of the steam being disposed within the upper regions of the cooking chambers 110, 110 while heat, generated from the heated grills or platens 122,122, impart heat to the lower regions of the cooking chambers.

As was previously noted, the cooking appliance 100 is disposed within housing 102 which has the configuration of a rectangular parallelepiped and that the steam generator 104 is integrally mounted upon or incorporated within a first side wall portion 132 of the housing 102, a user interface or control panel 134 is integrally formed upon a second or front side wall portion 136 of the housing 102, and a food scrap container 138 is removably mounted upon a third side wall portion 140 of the housing 102. The user interface or control panel 134 contains various inputs for controlling the various cooking parameters of the food cooking cycle, while the food scrap container 138 is provided for collecting food scraps, generated during the various food cooking cycles, and which may be collected by scraping the food scraps off from the heated platens or grills 122,122 at the end of each food cooking cycle. The detachability of the food scrap container 138 from the third side wall portion 140 of the housing 102 permits the collected food scraps to be periodically discarded. The food scrap container 138 may then, of course, be re-installed upon the third side wall portion 140 of the housing 102 so as to be capable of collecting food scraps generated during future food cooking cycles. The food scrap container 138 may be detachably mounted upon the third side wall portion 140 of the housing 102 by means of any suitable quick-mount fasteners, such as, for example, VELCRO® fasteners, headed fasteners and bayonet slots, and the like. It is lastly noted that the heated platens or grills 122,122 may also be utilized for cooking or grilling different types of foods, such as, for example, different types of meat or fish, such as bacon, ham, salmon, tuna, and the like.

Figure 2:
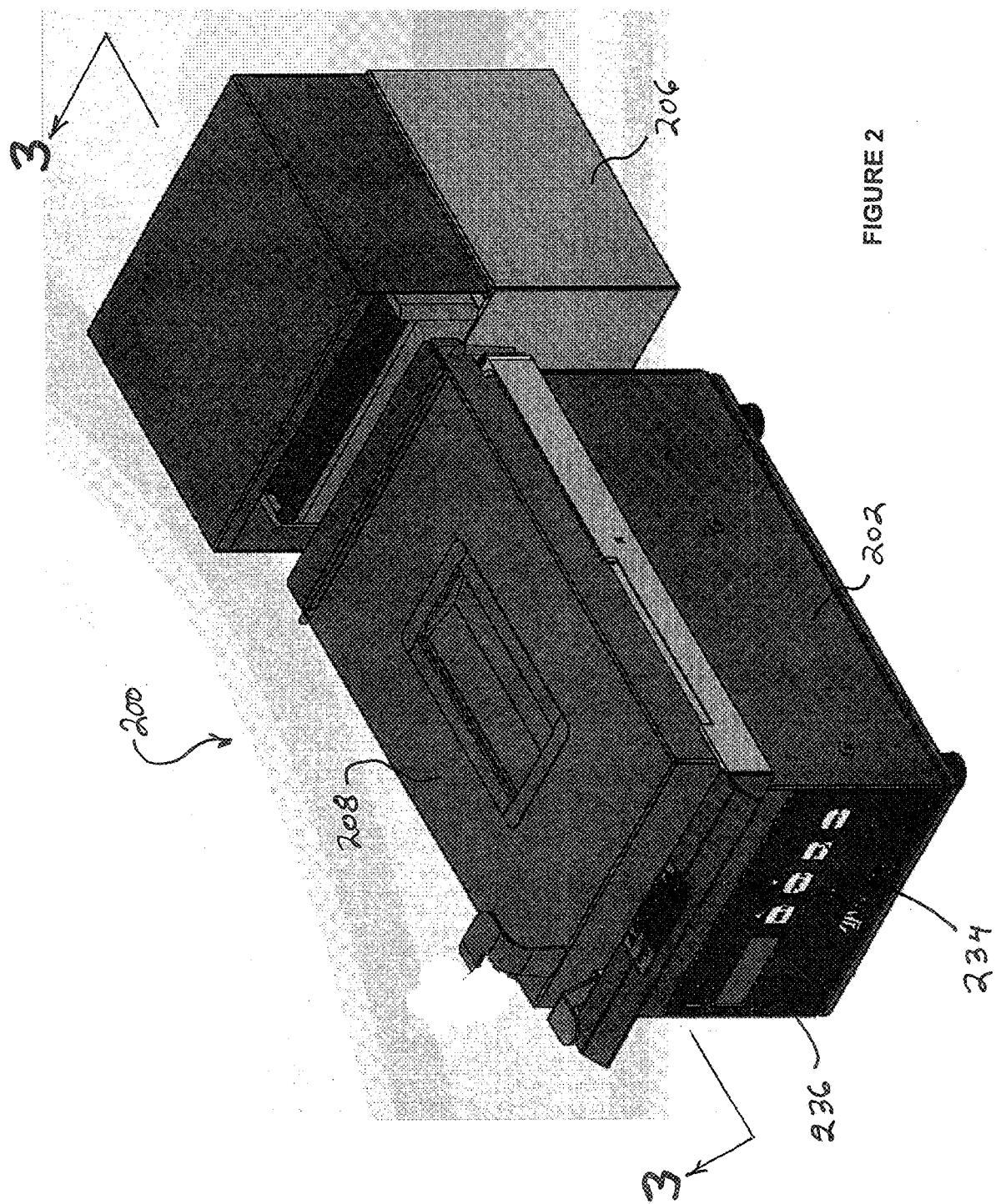
FIG. 2 is a perspective view of a second embodiment of a new and improved food cooking appliance or apparatus, as constructed in accordance with the principles and teachings of the present invention, wherein the steam generator is incorporated within a steam generator housing or container which is entirely separate from the cooking appliance housing but is fluidically connected thereto by means of a suitable fluid conduit.
Figure 3:
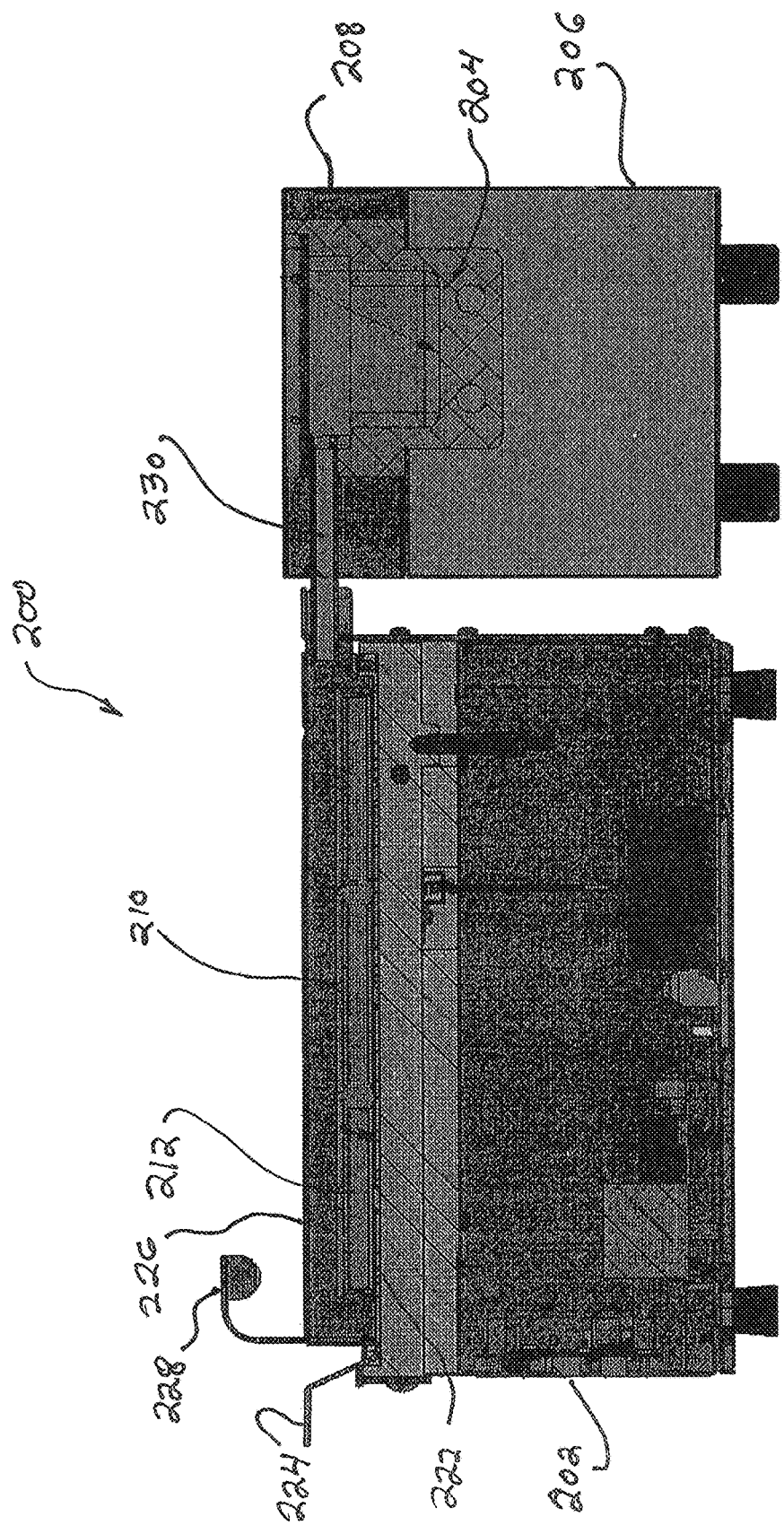
FIG. 3 is cross-sectional view of the second embodiment cooking appliance-steam generator appliance as disclosed within FIG. 2 and as taken along line 3-3 of FIG. 2.

With reference now being made to FIGS. 2 and 3, there is disclosed a second embodiment of a new and improved food cooking appliance or apparatus which is constructed in accordance with the principles and teachings of the present invention and which is generally indicated by the reference character 200. It is to be appreciated that this second embodiment of the new and improved food cooking appliance or apparatus 200 is structurally similar to the first embodiment of the new and improved food cooking appliance or apparatus 100 in certain respects, is structurally dissimilar to the first embodiment of the new and improved food cooking appliance or apparatus 100 in certain other respects, but the overall operation of the two embodiments of the new and improved food cooking appliance or apparatus is basically the same. In addition, it is further noted that structural components of the second embodiment of the new and improved food cooking appliance or apparatus 200 which effectively correspond to structural components of the first embodiment of the new and improved food cooking appliance or apparatus 100 will be noted by corresponding reference numbers except that they will be in the 200 series.

More particularly, it is seen that the food cooking appliance or apparatus 200 comprises a food cooking housing 202 which has a configuration which is generally that of a rectangular parallelepiped. In accordance with the unique features and structure of the cooking appliance 200, and in a manner similar to that of the first embodiment of the cooking appliance or apparatus 100, the second embodiment of the food cooking appliance or apparatus 200 also utilizes both steam and heat for rapidly cooking food products in an accelerated manner. Accordingly, as can best be seen in FIG. 3, a steam generator 204 is disposed within a steam generator housing 206, however, unlike the first embodiment of the food cooking appliance or apparatus 100 wherein the steam generator 104 was incorporated within a first side wall portion of the food cooking housing 102, the steam generator 204 of the second embodiment food cooking appliance or apparatus 200 is disposed within its steam generator housing 206 which is wholly separate from the food cooking housing 202 and yet is fluidically connected to the food cooking housing 202 by means of a suitable fluid conduit 230. It is to be noted at this juncture that while the fluid conduit 230 appears to be a substantially rigid tubular conduit which has its opposite ends effectively hermetically sealed when installed within both the food cooking housing 202 and the steam generator housing 206, the fluid conduit may be a flexible conduit, and of varying lengths, so as to permit the steam generator housing 206, having the steam generator 204 disposed therein, mounted at a location within the kitchen facility of the restaurant which may not be capable of accommodating both the food cooking housing 202 and the steam generator housing 206. The steam generator housing 206 is also provided with a cover 208 which is pivotally mounted upon an outer edge portion of the steam generator housing 206 so as to close the steam generator housing 206 when the steam generator 204 is in operation.

It is additionally seen that the food cooking housing 202 of the food cooking appliance 200 further comprises at least one food cooking chamber 210, although the appliance is obviously not limited to any specific number of food cooking chambers. Within the food cooking chamber 210 there is disposed a plate or template 212 wherein the plate or template 212 is provided with a plurality of through-openings, not shown but similar to the openings 114 of the first embodiment of the food cooking appliance or apparatus 100, although, again, the particular number of openings provided within the plate or template 212 is not limited to four. It is also to be appreciated that the openings can have different geometrical configurations, and in addition, the openings can have different size dimensions. Still further, as was also the case with the first embodiment of the food cooking appliance or apparatus 100, each opening is provided with a food containment ring, also not shown but similar to food containment rings 116 of the first embodiment of the food cooking appliance 100, which effectively conform to the size and configuration of the respective openings defined within the food containment rings. The plate or template 212 is pivotally mounted upon the food cooking housing 202 by means of a suitable hinge mechanism, not shown, and an upstanding handle 224 is provided for manipulating the plate or template 212 between its raised and lowered positions. A heated platen or grill 222 is disposed beneath the plate or template 212 such that when food product, such as, for example, eggs or pancake batter, are poured into the food containment rings, the food products will effectively be disposed atop the heated platen or grill 222 so as to be heated and cooked by means of the heated platen or grill 222. The food containment rings, not shown, are provided so as to contain the food product therewithin during the food cooking cycle and may accordingly be fabricated from a suitable material, such as, for example, polytetrafluoroethylene or TEFLON® or other thermoplastic material such that upon completion of the food cooking cycle, the plate or template 212 can be pivotally moved upwardly away from the heated platen or grill 222 such that the cooked food products will be readily released from the food containment rings, not shown, and will be disposed upon the heated platen or grill 222 whereby they may be removed therefrom by service personnel using a spatula or similar device.

Continuing further, it is also seen that the food cooking chambers 210 is provided with a cover 226 which is adapted to be disposed atop the food cooking chamber 210 so as to render the food cooking chamber 210 an enclosed food cooking environment. A suitable upstanding handle 228 is provided upon the cover 226 so as to readily enable service personnel to remove the cover 226 from its position atop the heated platen or grill 122 or to place the cover 226 upon the heated platen or grill 222. It is noted that when the cover 226 is disposed atop the heated platen or grill 222, the lower peripheral edge portions of the cover 226 are effectively seated upon the peripheral edge portions of the heated platen or grill 222 so as to effectively surround the peripheral edge portions of the plate or template 212. The cover 226 may be fabricated from any suitable material, such as, for example, a clear thermoplastic material, stainless steel, or the like. It is to be emphasized that in accordance with a unique structural feature of the present invention, the steam generator 204, as was the case of the steam generator 104, is fluidically connected to the food cooking chambers 210 by means of the steam or fluid conduits 230 so as to conduct steam, from the steam generator 204, into the upper regions of the enclosed food cooking chamber 210. In this manner, the food products, disposed within the food containment rings, not shown are cooked in an accelerated manner by means of both the steam conducted into the upper regions of the enclosed food cooking chamber 210, as well as by the heat generated by means of the heated platen or grill 222. In addition, it is also to be noted that the food is cooked in an even or balanced manner as a result of the steam being disposed within the upper regions of the cooking chamber 110 while heat, generated from the heated grill or platen 122, impart heat to the lower regions of the cooking chamber 210.

Lastly, as was previously noted in connection with the first embodiment of the cooking appliance 100, the cooking appliance 200 is disposed within housing 202 which has the configuration of a rectangular parallelepiped wherein a user interface or control panel 234 is integrally formed upon a front side wall portion 236 of the housing 202, it being appreciated that the user interface or control panel 234 contains various inputs for controlling the various cooking parameters of the food cooking cycle. It is also noted and emphasized that this second embodiment of the new and improved cooking appliance 200 is readily adaptable and operationally flexible for use within particular kitchen facilities of particular restaurants whereby the food cooking housing 202 can effectively be located in one area or region of a kitchen facility, while the steam generator housing 206 can be located in another area or region of the kitchen facility such that different areas or regions of the kitchen facility, which may not solely be capable of spatially accommodating both the food cooking housing 202 and the steam generator housing 206, can nevertheless spatially accommodate the separate cooking and steam generator housings 202,206. In addition, as a result of the fluid conduit 230 being fluidically connected between the steam generator housing 206 and the food cooking 202, and preferably being fitted with suitable quick connect/disconnect connectors such that the steam generator housing can be readily fluidically connected or disconnected to or from the cooking housing as needed for cleaning or maintenance, or alternatively, to permit the fluid conduit to be operatively connected to different types of appliances as needed or desired in order to satisfy cooking requirements of different steam cooking appliances, the overall food cooking appliance 200 is readily adaptable for different cooking needs, requirements, or processes. Lastly, the separate steam generator may also be provided with a plurality of fluid conduits so that a single steam generator can be utilized to simultaneously provide steam to a plurality of cooking appliances.

Obviously, many variations and modifications of the present invention are possible in light of the above teachings. It is therefore to be understood that within the scope of the appended claims, the present invention may be practiced otherwise than as specifically described herein.

REFERENCE NUMBER KEY FOR INVENTION COMPONENTS

100—First embodiment of a food cooking appliance
102—Housing of 100
104—Steam generator
106—Steam generator housing
108—Cover for 106
110—Food cooking chamber
112—Plate or template
114—Openings in 112
116—Food containment rings
118—Hinge mechanism for 112
120—Partition wall between 106 and 110
122—Heated platen or grill
124—Handles for moving 122
126—Cover for 110
128—Handles on covers 126
130—Steam conduits connecting 106 to 110
132—First side wall portion of housing 102
134—User interface or control panel
136—Second side wall portion of housing 102
138—Food scrap container
140—Third side wall portion of housing 102
200—Second embodiment of a food cooking appliance
202—Food cooking housing
204—Steam generator
206—Steam generator housing
208—Cover of steam generator housing
210—Food cooking chamber within food cooking housing
212—Plate or template within food cooking chamber
222—Heated platen of food cooking chamber
224—Handle for heated platen
226—Cover for food cooking chamber
228—Handle for cover 226
230—Steam conduit connecting steam generator housing to food cooking chamber

What is claimed as new and desired to be protected by letters patent, is:

1. A food cooking appliance or apparatus for cooking food products, comprising:
   a food cooking housing;
   at least one food cooking chamber defined within said food cooking housing for containing food to be cooked;

at least one heated platen or grill, upon which a food product is disposed, disposed within said at least one food cooking chamber for generating heat so as to cook the food product; and a steam generator disposed within a steam generator housing which is wholly separate and apart from said food cooking housing yet fluidically connected to said at least one food cooking chamber by a fluid conduit extending between said steam generator housing and said food cooking housing so as to provide steam within said at least one food cooking chamber in order to also cook the food product, whereby the food product is cooked in an accelerated and balanced manner within said at least one food cooking chamber as a result of being cooked both by the steam, generated by said steam generator and conducted into upper regions of said at least one food cooking chamber, and by heat generated by said at least one heated platen or grill and imparted to the food product disposed within a lower portion of said at least one food cooking chamber.

2. The food cooking appliance or apparatus as set forth in claim 1, wherein:
said fluid conduit comprises a rigid tubular conduit.

3. The food cooking appliance or apparatus as set forth in claim 2, wherein:
said food cooking housing and said steam generator housing can be located within different locations of a kitchen facility and yet fluidicially connected together by said rigid tubular conduit.

4. The food cooking appliance or apparatus as set forth in claim 1, wherein:
said fluid conduit comprises a flexible tubular conduit.

5. The food cooking appliance or apparatus as set forth in claim 4, wherein:
said food cooking housing and said steam generator housing can be located within different locations of a kitchen facility and yet fluidicially connected together by said flexible tubular conduit.

6. The food cooking appliance or apparatus as set forth in claim 1, further comprising:
at least one plate or template disposed within said at least one food cooking chamber and having at least one through-hole defined therein; and
a food containment ring, disposed within said at least one through-hole defined within said at least one plate or template, for containing the food product to be cooked.

7. The food cooking appliance or apparatus as set forth in claim 6, wherein:
said food containment ring is fabricated from a thermoplastic material so as to facilitate the separation of the cooked food product from said food containment ring after the food product has been cooked.

8. The food cooking appliance or apparatus as set forth in claim 6, wherein:
said at least one plate or template disposed within said at least one food cooking chamber comprises a pair of plates or templates respectively disposed within said pair of food cooking chambers.

9. The food cooking appliance or apparatus as set forth in claim 6, wherein:
said at least one through-hole defined within said at least one plate or template comprises a plurality of through-holes defined within said at least one plate or template.

10. The food cooking appliance or apparatus as set forth in claim 9, wherein:
said plurality of through-holes defined within said at least one plate or template have different configurations.

11. The food cooking appliance or apparatus as set forth in claim 9, wherein:
said plurality of through-holes defined within said at least one plate or template have different size dimensions.

12. The food cooking appliance or apparatus as set forth in claim 6, wherein:
said at least one plate or template is pivotally movable between first raised and second lowered positions relative to said at least one heated platen or grill.

13. The food cooking appliance or apparatus as set forth in claim 12, further comprising:
a handle fixedly mounted upon said at least one plate or template for moving said at least one plate or template between said first raised and second lowered positions relative to said at least one heated platen or grill.

14. The food cooking appliance or apparatus as set forth in claim 6, further comprising:
a cover removably disposed atop said at least one plate or template and said at least one heated platen or grill so as to enclose said at least one food cooking chamber.

15. The food cooking appliance or apparatus as set forth in claim 1, wherein:
said at least one food cooking chamber comprises a pair of food cooking chambers disposed adjacent to each other within said food cooking housing.

16. The food cooking appliance or apparatus as set forth in claim 1, wherein:
said food cooking housing has the configuration of a rectangular parallelepiped.

17. The food cooking appliance or apparatus as set forth in claim 1, wherein:
a user interface or control panel is mounted upon a wall portion of said food cooking housing.

* * * * *